United States Patent [19]
Kubo

[11] Patent Number: 5,952,908
[45] Date of Patent: Sep. 14, 1999

[54] COIL BOBBIN AND AN EXCITING COIL ASSEMBLY

[75] Inventor: Tsutomu Kubo, Osaka, Japan

[73] Assignee: Mita Industrial Co., Ltd., Osaka-fu, Japan

[21] Appl. No.: 08/677,434

[22] Filed: Jul. 2, 1996

[30]   Foreign Application Priority Data

Jul. 6, 1995   [JP]   Japan ..................................... 7-171174

[51] Int. Cl.$^6$ .................................................. H01F 27/30
[52] U.S. Cl. ............................................ 336/192; 336/208
[58] Field of Search ..................................... 336/198, 208, 336/192; 310/71

[56]         References Cited
         U.S. PATENT DOCUMENTS 3,230,490   1/1966   Johnson ................................... 336/192
3,461,413   8/1969   Randolph et al. ....................... 336/192
3,461,414   8/1969   Fearon et al. ............................ 336/192
4,122,425   10/1978  Hughes ..................................... 336/192
4,588,973   5/1986   Grah et al. ............................... 336/192

*Primary Examiner*—Thomas J. Kozma
*Attorney, Agent, or Firm*—Jordan and Hamburg LLP

[57]           ABSTRACT

A coil bobbin comprises:
  a cylindrical body having a through hole in the center thereof; a separating flange formed on an outer surface of the cylindrical body between opposite ends thereof; a coil winding portion provided on one side of the separating flange in a longitudinal direction of the cylindrical body; a lead wire retaining portion provided on the other side of the separating flange in the longitudinal direction of the cylindrical body; a protector provided at the end of the lead wire retaining portion for protecting a lead wire to be placed in the lead wire retaining portion.

8 Claims, 8 Drawing Sheets

COIL BOBBIN AND AN EXCITING COIL ASSEMBLY

BACKGROUND OF THE INVENTION AND RELATED ART STATEMENT

The present invention broadly relates to a coil bobbin and an exciting coil assembly. More particularly, the invention is concerned with a coil bobbin suited for making an exciting coil assembly to be used in an electromagnetic clutch as well as with such an exciting coil assembly.

Figure 8:
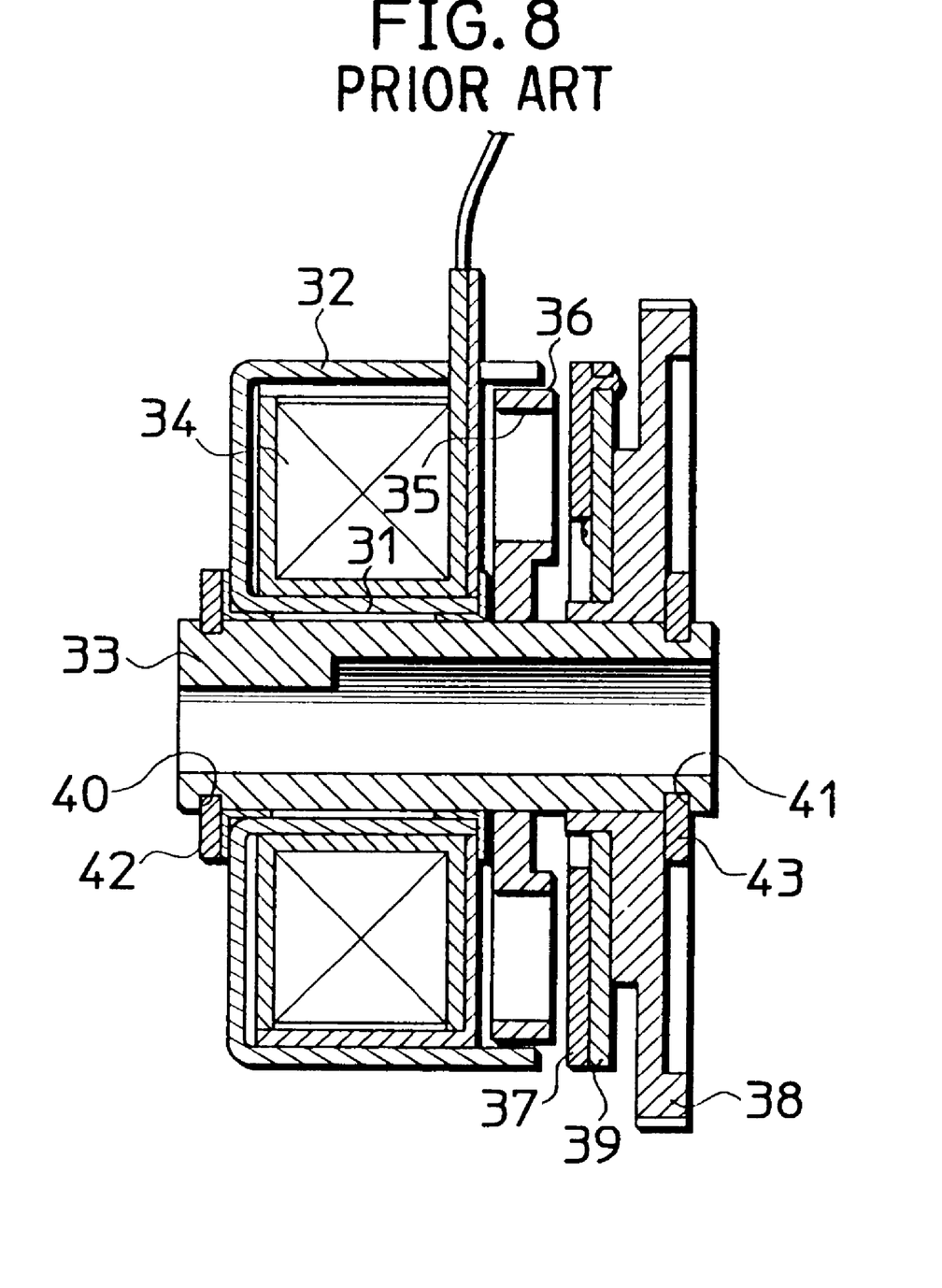
FIG. 8 is a cross-sectional view of a conventional electromagnetic clutch.

In explaining a conventional coil bobbin and exciting coil assembly, general construction of an electromagnetic clutch is described at first. Generally, an electromagnetic clutch is constructed as illustrated in FIG. 8. Designed for use in a paper feeding mechanism of a copying machine, for instance, the electromagnetic clutch illustrated comprises a field housing 32 configured in a bottomed double cylindrical body furnished with a cylindrical mounting sleeve 31 which is passed through the center of the field housing 32. A cylindrical shaft 33 is rotatably fitted inside the mounting sleeve 31 of the field housing 32. Inside the field housing 32, a ring-shaped exciting coil assembly 34 is mounted around the mounting sleeve 31.

A rotor 36 having slits 35 located at positions facing the exciting coil assembly 34 is fixedly mounted on the shaft 33 while an armature 37 is rotatably mounted on the shaft 33 at a position facing the rotor 36. Further, a driving force transmission mechanism 38 including a gear is rotatably mounted on the shaft 33 at a position facing the armature 37, which is integrally fixed to the driving force transmission mechanism 38 with a ring-shaped flat spring 39 interposed in between.

The shaft 33 has retaining ring mounting grooves 40 and 41 formed close to its both ends, and retaining rings 42 and 43 are fitted in the retaining ring mounting grooves 40 and 41, respectively, to prevent the individual components mentioned above from coming off the shaft 33. Among the aforementioned components, at least the field housing 32, shaft 33, rotor 36 and armature 37 is constructed with a magnetic material, such as a ferrous material.

In the electromagnetic clutch thus constructed, the driving force transmission mechanism 38 driven by an unillustrated driving source rotates around the shaft 33 together with the armature 37. When the exciting coil assembly 34 is energized, magnetic flux is generated by the exciting coil assembly 34 through a magnetic circuit formed by the field housing 32, shaft 33 and rotor 36. Leakage flux occurring in the slits 35 of the rotor 36 produces an attractive force and, therefore, the rotor 36 attracts the armature 37, overwhelming an elastic force of the flat spring 39. As a result, the rotor 36 rotates together with the driving force transmission mechanism 38, and the shaft 33 to which the rotor 36 is fixed also rotates.

When the exciting coil assembly 34 is de-energized, the attractive force between the rotor 36 and armature 37 is lost since the magnetic flux disappears. In consequence, the armature 37 is separated from the rotor 36 and pulled back toward the driving force transmission mechanism 38 due to the elastic force of the flat spring 39.

Figure 9:
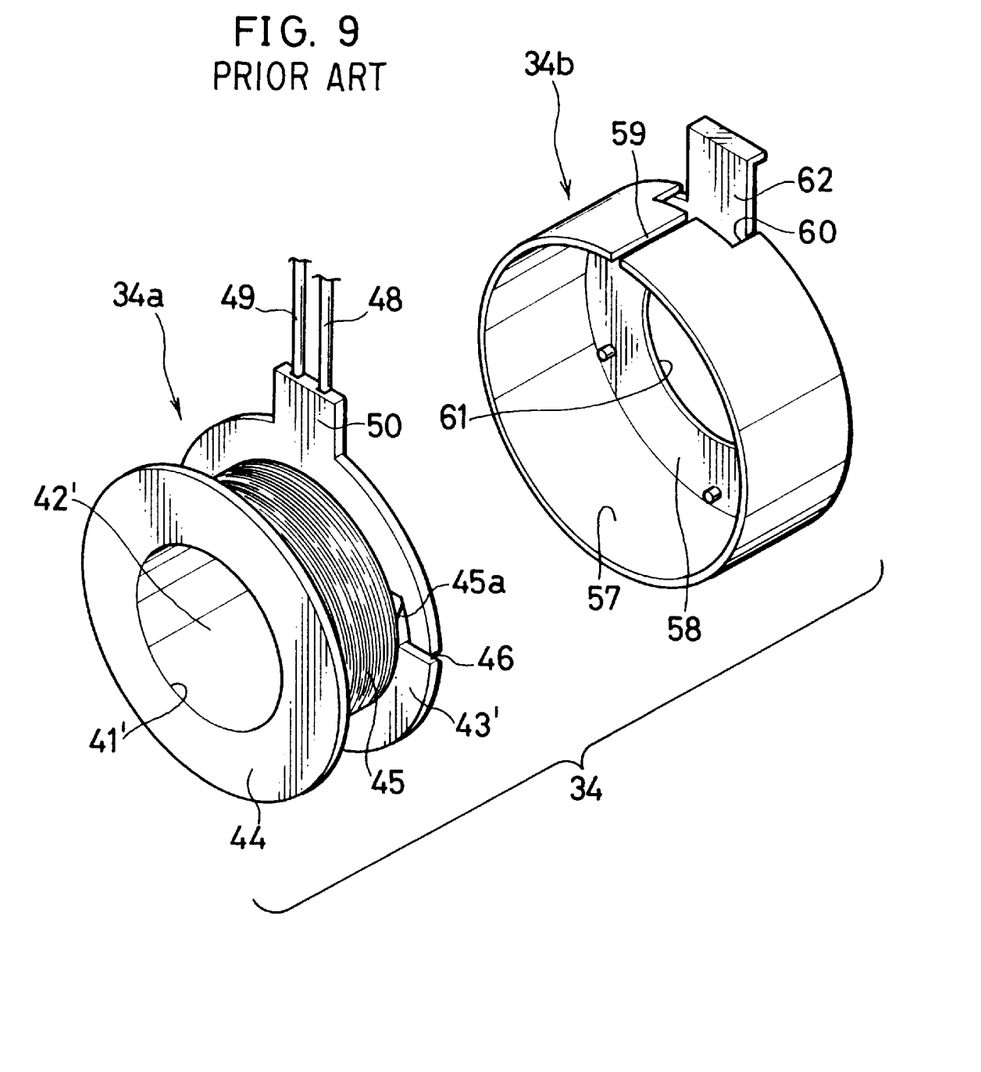
FIG. 9 is an exploded perspective view of a conventional exciting coil assembly.
Figure 10:
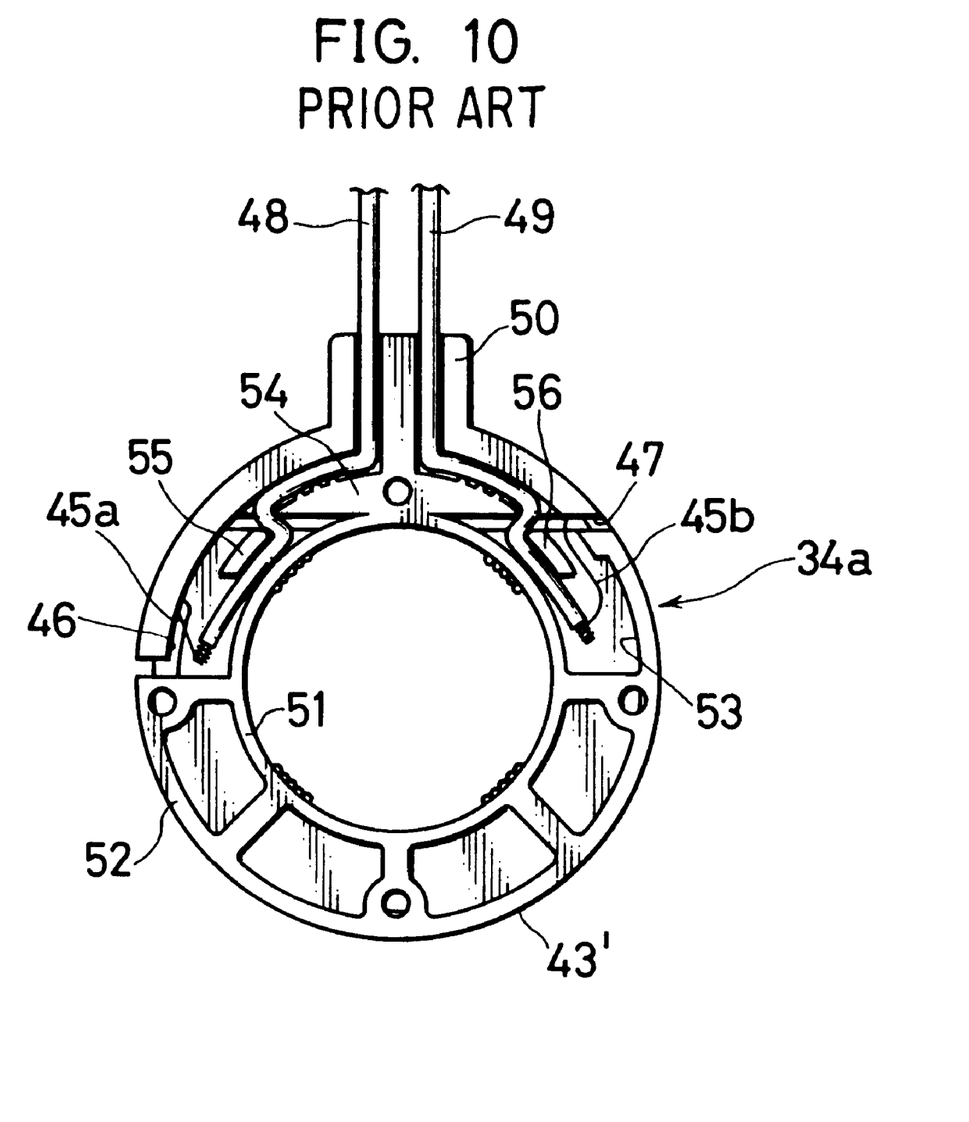
FIG. 10 is a side view of a coil unit of the conventional exciting coil assembly shown in FIG. 9.

The exciting coil assembly 34 of the above-described electromagnetic clutch is constructed as illustrated in FIGS. 9 and 10, where FIG. 9 is an exploded perspective view of the exciting coil assembly 34, and FIG. 10 is a side view of a coil unit 34a of the exciting coil assembly 34. As shown in FIG. 9, the exciting coil assembly 34 comprises the coil unit 34a and a cover unit 34b which is mounted over the coil unit 34a. The coil unit 34a includes a cylindrical body 42' made of an insulating material, which has a through hole 41' in the middle and a pair of ring-shaped flanges 43' and 44 at both ends, and a coil 45 wound around a coil winding portion of the cylindrical body 42' formed between its flanges 43' and 44. Both ends 45a and 45b of the coil 45 are individually passed through a pair of slits 46 and 47 formed in the flange 43' and soldered to ends of a pair of lead wires 48 and 49 on an outside surface of the flange 43'.

The pair of lead wires 48 and 49 to which the ends 45a and 45b of the coil 45 are connected are run through a lead wire guide 50 projectingly formed on the periphery of the flange 43' to external circuitry. On the outside surface of the flange 43', there are provided an inner ring-shaped projection 51 and an outer ring-shaped projection 52, forming a recessed portion 53 therebetween to allow the pair of lead wires 48 and 49 to be arranged without projecting from the outside surface of the flange 43'. The pair of lead wires 48 and 49 accommodated in the recessed portion 53 are laid along guideways provided by a plurality of guiding projections 54, 55 and 56 formed in the recessed portion 53 as well as the inner ring-shaped projection 51 and outer ring-shaped projection 52 and led out through the lead wire guide 50.

The cover unit 34b is a one-piece formed component including a coil cover 57 which, made of a film-like insulating material, wraps around the coil 45 and a flange cover 58 which covers the outside surface of the flange 43'. The inside diameter of the coil cover 57 is same as the outside diameter of the flanges 43' and 44 of the cylindrical body 42'. The coil cover 57 has at its top a straight cut 59 and a cutout 60 into which the lead wire guide 50 of the flange 43' is fitted. The flange cover 58 has a through hole 61 at a middle position corresponding to the through hole 41' of the cylindrical body 42' and a projection 62 located at the position of the cutout 60 in the coil cover 57 for covering the outside surface of the lead wire guide 50.

When the cover unit 34b is mounted on the coil unit 34a, the coil cover 57 encloses the coil 45 and the flange cover 58 covers the outside surface of the flange 43' to complete the exciting coil assembly 34. The following procedure is used when fitting the cover unit 34b on the coil unit 34a. With the straight cut 59 in the coil cover 57 spread out upward, the cover unit 34b is placed in contact with the coil unit 34a on the outside surface of its flange 43'. As the cover unit 34b is forced against the coil unit 34a, the lead wire guide 50 of the flange 43' slips into the cutout 60 and the cover unit 34b is properly fitted on the coil unit 34 a. Then, an adhesive tape is attached over the straight cut 59 to prevent it from opening and the cover unit 34b from coming off the coil unit 34a.

The reasons why the exciting coil assembly 34 is constructed by covering the coil unit 34a with the cover unit 34b are as follows. This construction facilitates soldering work since both ends 45a and 45b of the coil 45 can be soldered to the pair of lead wires 48 and 49 on the exposed outside of the flange 43'. The coil unit 34a is covered with the cover unit 34b for preventing a short circuit of the coil 45 which may otherwise occur should the exposed solder joints between both ends 45a and 45b of the coil 45 and the pair of lead wires 48 and 49 come into contact with adjacent components when assembled into the electromagnetic clutch. The above-described construction of the exciting coil assembly 34 provides ease of soldering and good electric insulation performance of the joints between both ends 45a and 45b of the coil 45 and the pair of lead wires 48 and 49.

The conventional exciting coil assembly 34 is constructed by fitting the coil unit 34a into the cover unit 34b as seen above. Although the conventional exciting coil assembly 34 has the aforementioned advantages, it entails rather complicated management of constituent components, and assembling of the coil unit 34*a* and cover unit 34*b* is essential in manufacturing stages, making it difficult to streamline its assembly work.

The coil 45 completely fits into the coil winding portion of the cylindrical body 42' without producing any outward projection according to the above-described construction of the conventional exciting coil assembly 34. Therefore, no problem will arise concerning electric insulation performance even when the coil cover 57 is eliminated. The flange cover 58 is, however, essential for ensuring electric insulation performance because the solder joints between both ends 45*a* and 45*b* of the coil 45 and the pair of lead wires 48 and 49 are exposed on the outside surface of the flange 43' and could potentially stick out of the flange 43'. It is therefore impossible to eliminate the cover unit 34*b* in the above-described construction of the conventional exciting coil assembly 34.

SUMMARY OF THE INVENTION

Accordingly, it is an object of the invention to provide a coil bobbin and an exciting coil assembly which can be constructed with a reduced number of constituent components without sacrificing ease of connection and electric insulation performance of joints between both ends of a coil and a pair of lead wires so that component control and assembling of the exciting coil assembly can be simplified and streamlined.

A coil bobbin according to the invention comprises:
a cylindrical body having a through hole in the center thereof;
a separating flange formed on an outer surface of the cylindrical body between opposite ends thereof;
a coil winding portion provided on one side of the separating flange in a longitudinal direction of the cylindrical body;
a lead wire retaining portion provided on the other side of the separating flange in the longitudinal direction of the cylindrical body;
a protector provided at the end of the lead wire retaining portion for protecting a lead wire to be placed in the lead wire retaining portion.

An exciting coil assembly with the above mentioned coil bobbin of the invention, joint portions between individual ends of a coil and a pair of lead wires can be accommodated in the lead wire retaining portion (or groove) so that the joint portions are not exposed. This eliminates a need for a dedicated member for maintaining electrical insulation ability at the joint portions. It is therefore possible to simplify component control and assembling process of the exciting coil assembly.

In the coil bobbin according to a preferred form of the invention, a guide block is formed on the separating flange and a passage adapted for guiding a lead wire is defined in the guide block.

An exciting coil with this arrangement of the coil bobbin helps arrange the lead wires so that the relative angular position of the lead wires with respect to the coil bobbin is maintained. This structure will ease a degree of cumbersome operation regarding the handling the lead wire ends in the assembling process.

In the coil bobbin according to another preferred form of the invention, the guide block projects from the separating flange to the protector along the longitudinal axis of the cylindrical body and
the passage defined in the guide block extends substantially radially outwardly from a central axis of the cylindrical body, and
a cut out portion for allowing communication between the through hole of the cylindrical body and the passage defined in the protector and
a pair of guide slits intersecting a line connecting the cutout portion and the passage are defined between the guide block and the protector for allowing a communication between the passage and the lead wire retaining portion.

With this arrangement, the operation of attaching the lead wires to the lead wire retaining portion can be easily performed as in the following procedures. It is first to put the leading ends of wires through the passage defined in the guide block then the ends are further pulled down to the through hole of the cylindrical body via the cut out portion defined in the protector. Then the ends of the lead wires are split apart to fit into the respective guide slits defined between the guide block and the protector and the respective ends of the wires are placed in the lead wire retaining portion. The cut out portion allows the ends of the lead wires to extend from the guide block to the distant inner surface of the through hole thus it makes easier for the operator (or manufacturing machine) to grab the extended ends of the lead wires (extended portion from the end of the guide block to the through hole) to split the ends along the respective guide slits for leading them into the lead wire retaining portion. Without the cut out portion in the protector, the ends portion of the lead wires just passed through the passage of the guide block are hard to grasp so that it would be much easier as in this construction if the length of the extended ends portion of the lead wires is sufficiently long. For this reason, this arrangement makes the attaching operation of the lead wire much easier than it would without the cut out portion defined in the protector.

In the coil bobbin according to still another preferred form of the invention, a pair of slits are defined in the separating flange for allowing a communication between the coil winding portion and the lead wire retaining portion and a short circuit protection tab is formed in the lead wire retaining portion at an angular position between the pair of slits for preventing a short circuit of the coil by a mutual contact between both ends of the coil.

With this arrangement, a mutual contact between both ends of the coil can be effectively prevented. Accordingly the coil bobbin of the invention enhances the electrical insulation performance.

In the coil bobbin according to yet another preferred form of this invention, the separating flange is made in a stepped configuration in its side view such that the further away it is from the central axis of the cylindrical body, the wider the longitudinal distance between the separating flange and the protector is.

With this arrangement, the lead wires can be placed in a narrow portion of the lead wire retaining portion when they have a smaller diameter, a wide portion of the lead wire retaining portion when they have a large diameter. This arrangement eliminates the need for preparing different types of coil bobbins depending on the size of the lead wires. It contributes a standardization of the component and in turn simplifies component control.

In the coil bobbin according to yet another preferred form of the invention, the cut out portion is positioned with respect to the passage such that a first line extending along a middle portion of the passage goes through the cut out portion; and the guide slits are defined for allowing communication between the through hole and the lead wire retaining portion through the cut out portion and the guide slits extend substantially perpendicular to the first line.

With this arrangement, the manufacturing process, in particular, the attachment of the lead wires to the lead wire retaining portion can be easily performed. The passage defined in the guide block is aligned to the cut out portion in the protector in its plan view thus it makes easier to pull the lead wire ends down to the through hole of the cylindrical body. Furthermore, the portion of the lead wires, when they are accommodated in the lead wire retaining portion, are bent along the respective guide slits at right angle at around the position between the guide block and the guide slits thus it provides a higher resistance against the pulling force applied to the portions of the lead wires which project outwardly from the guide block. Thus this structure helps prevent the joint portion between the lead wire ends and the coil from being pulled directly by the outside force applied to the exposed portion of the lead wires. This in turn protect the joint portion from being damaged by the external force applied to the lead wires.

In the coil bobbin according to still another preferred form of the invention, a first diameter of the cylindrical body corresponding to the lead wire retaining portion is greater than a second diameter of the cylindrical body corresponding to the coil winding portion.

This arrangement helps increase the capacity of the coil winding portion.

An exciting coil assembly according to this invention comprises:

a cylindrical body having a through hole in the center thereof;

a separating flange formed on an outer surface of the cylindrical body between opposite ends thereof;

a coil winding portion provided on one side of the separating flange in a longitudinal direction of the cylindrical body;

a lead wire retaining portion provided on the other side of the separating flange in the longitudinal direction of the cylindrical body;

a protector provided at the end of the lead wire retaining portion for protecting a lead wire to be placed in the lead wire retaining portion;

a pair of lead wires placed in the lead wire retaining portion;

a coil wound around the cylindrical body corresponding to the coil winding portion; and both ends of the coil extending to the lead wire retaining portion and being connected with the pair of lead wires respectively.

With the exciting coil assembly with this arrangement, the joint portions between the individual ends of the coil and respective ends of the lead wires can be accommodated in the lead wire retaining portion (or grooves) so that the joint portions are not exposed. This eliminates a need for a dedicated member for exclusively protect the joint portions from contacting with the other objects to insure electrical insulation performance. It is therefore possible to simplify the component structure and assembly process.

In the exciting coil assembly according to a preferred form of the invention, a guide block is formed on the separating flange with a passage defined therein and the pair of lead wire extend through the passage.

In the exciting coil assembly according to another preferred form of the invention, the guide block projects from the separating flange to the protector along a longitudinal axis of the cylindrical body and
the passage defined in the guide block extends substantially outwardly from the longitudinal axis,
a cut out portion for allowing a communication between the through hole of the cylindrical body and the passage is defined in the protector,
a slit intersecting a line connecting the cutout portion and the passage is defined between the guide block and the protector for allowing communication between the passage and the lead wire retaining portion and thereby the lead wire extends from an outermost end of the guide block through the passage to the lead wire guiding portion via the slit.

With this arrangement, the operation of attaching the lead wires to the lead wire retaining portion can be easily performed as in the following procedures. It is first to put the leading ends of wires through the passage defined in the guide block then the ends are further pulled down to the through hole of the cylindrical body via the cut out portion defined in the protector. Then the ends of the lead wires are split apart to fit into the respective guide slits defined between the guide block and the protector and the respective ends of the wires are placed in the lead wire retaining portion. The cut out portion allows the ends of the lead wires to extend to the opposite end of the inner surface of the through hole thus it makes easier for the operator (or manufacturing machine) to grab the extended ends of the lead wires to split the ends along the respective guide slits for leading them into the lead wire retaining portion. Without the cut out portion in the protector, the ends portion of the lead wires just passed through the passage of the guide block are hard to grasp so that it would be much easier as in this construction if the length of the extended ends portion is sufficiently large. For this reason, this arrangement would make the attaching operation much easier than it is without the cut out portion defined in the protector.

In the exciting coil assembly according to still another preferred form of the invention, a pair of slits are defined in the separating flange thereby ends of coil extends through the slits respectively to the lead wire retaining portion and a short circuit protection tab is formed in the lead wire retaining portion at a position between the pair of slits for preventing a short circuit of the coil by a mutual contact between both ends of the coil.

With this arrangement, a mutual contact between both ends of the coil can be effectively prevented. Accordingly the exciting coil of this structure enhances electrical insulation performance.

In the exciting coil assembly according to another preferred form of the invention further comprises a press member for press fitting in the lead wire retaining portion from outwardly over the lead wires for securely accommodating the lead wire into the lead wire retaining portion.

With this arrangement, the pair of lead wires are securely held within the lead wire retaining portion so that the joint portion between the ends of the coil and respective ends of the lead wires do not come out of the lead wire retaining portion.

These and other objects, features and advantages of the present invention will more fully be understood upon reading the following detailed description in conjunction with the accompanying drawings.

DETAILED DESCRIPTION OF THE PREFERRED EMBODIMENTS OF THE INVENTION

Figure 1:
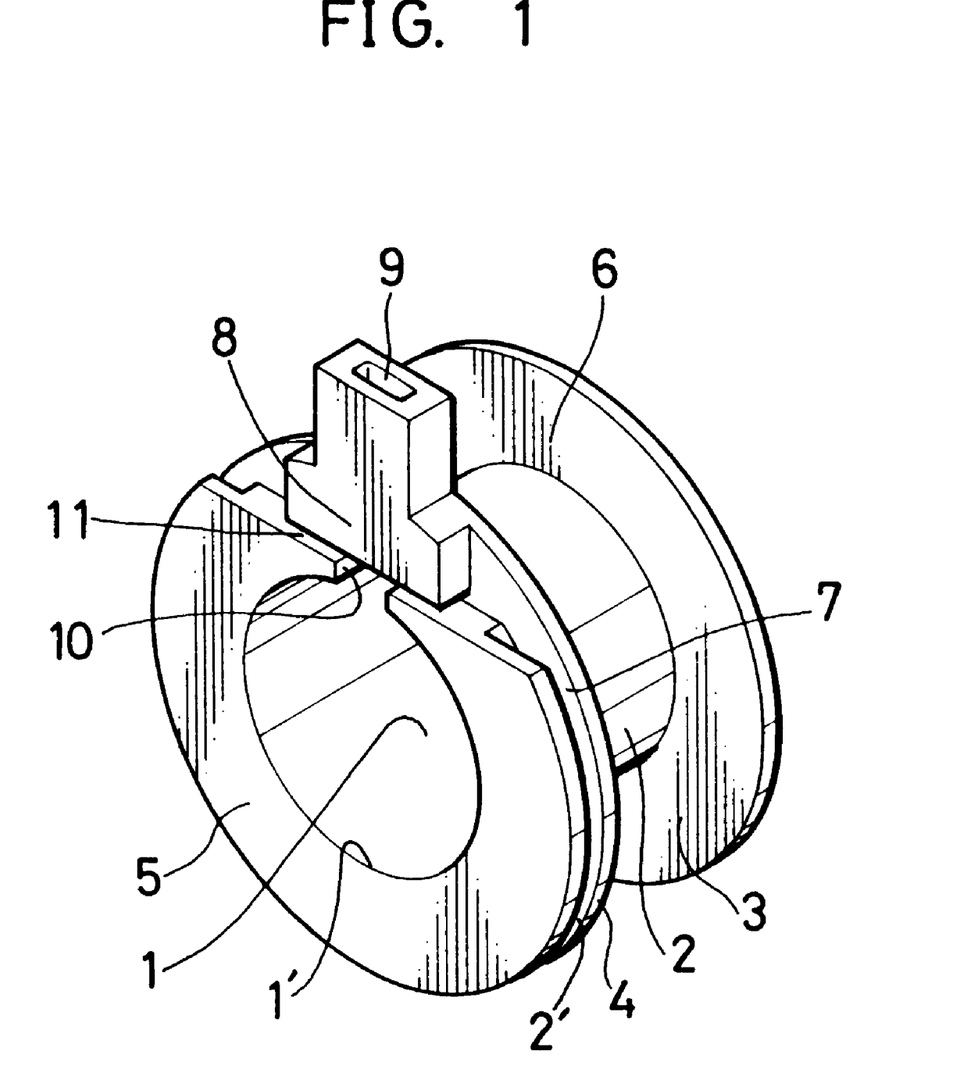
FIG. 1 is a perspective view of a coil bobbin according to an embodiment of the invention.
Figure 2:
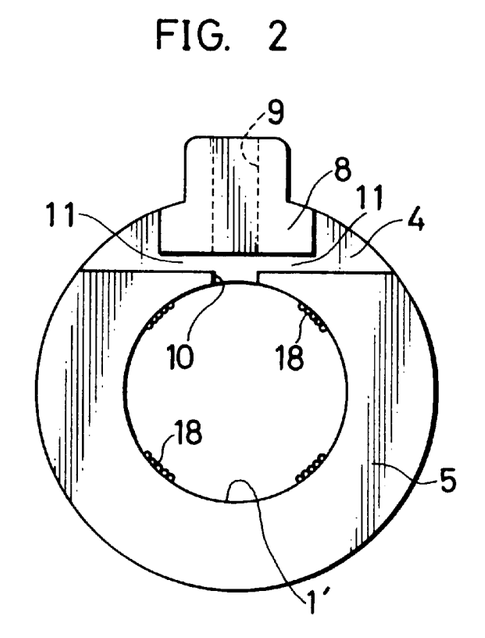
FIG. 2 is a side view of the coil bobbin shown in FIG. 3.
Figure 3:
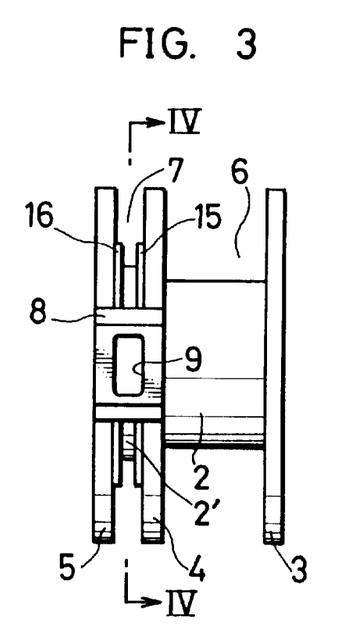
FIG. 3 is a plan view of the coil bobbin shown in FIG. 3.
Figure 4:
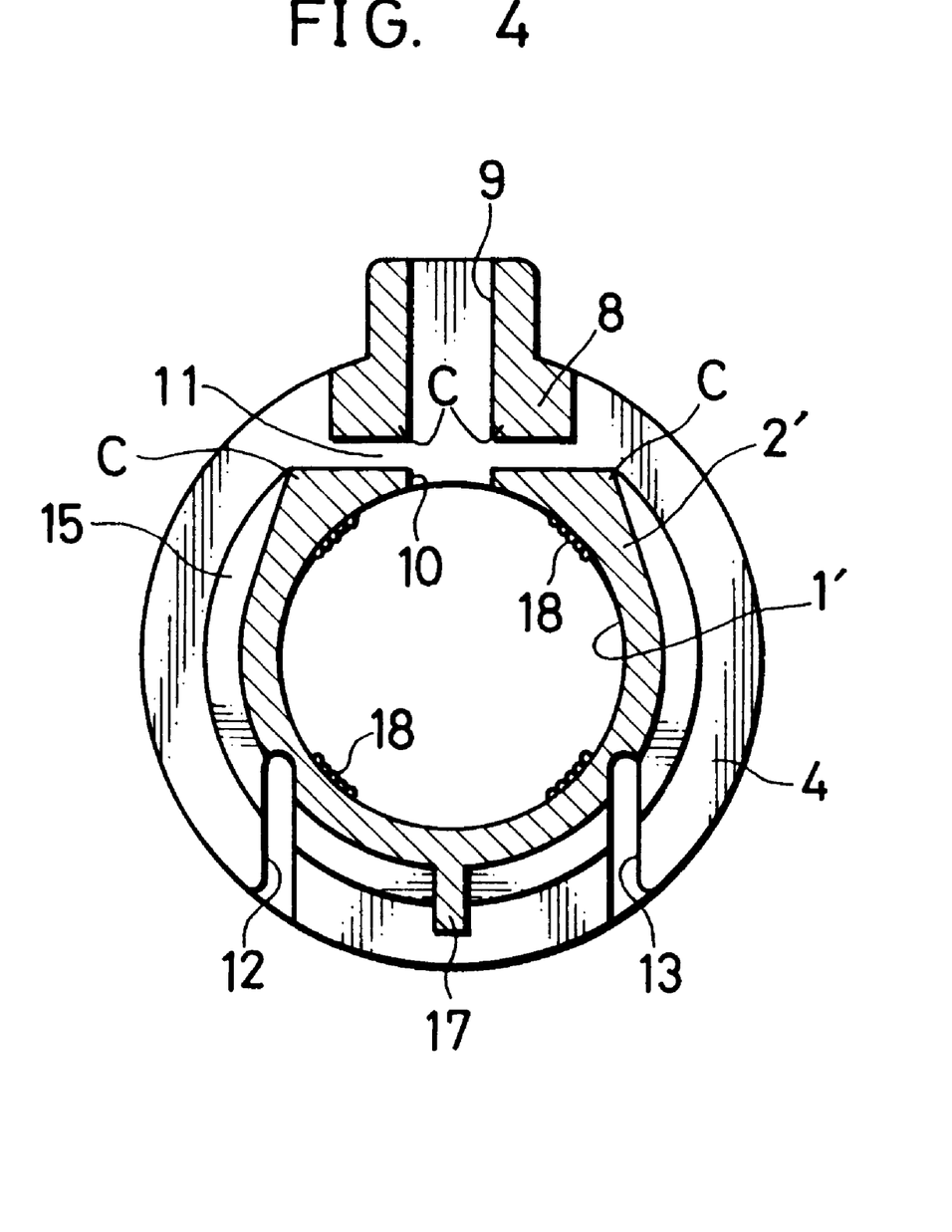
FIG. 4 is a cross-sectional view of the coil bobbin taken in the direction of arrows along lines A—A shown in FIG. 3.

FIG. 1 is a perspective view of a coil bobbin according to an embodiment of the invention; FIG. 2 is a side view of the coil bobbin; FIG. 3 is a plan view of the coil bobbin; and FIG. 4 is a cross-sectional view of the coil bobbin taken in the direction of arrows along lines A—A shown in FIG. 3.

Referring to these drawings, the coil bobbin constructed in an insulating material comprises a first cylindrical body 2 having a through hole 1 in the center, a first flange 3 formed at one end of the first cylindrical body 2 and a second flange 4 (also referred to as a separation flange) formed at the other end of the first cylindrical body 2. The coil bobbin further comprises a second cylindrical body 2' integrally formed with the first cylindrical body 2 outside the second flange 4, the second cylindrical body 2' having a through hole 1' concentrically arranged with the through hole 1 in the first cylindrical body 2, as well as a ring-shaped insulator flange 5 (also referred to as a protector) formed around the second cylindrical body 2' at a location slightly separated from the second flange 4. In the coil bobbin thus constructed, a coil winding portion 6 is formed around the first cylindrical body 2 just between the first flange 3 and second flange 4 while a lead wire retaining groove 7 is formed around the second cylindrical body 2' just between the second flange 4 and insulator flange 5. Although the through hole 1 of the first cylindrical body 2 and the through hole 1' of the second cylindrical body 2' have the same inside diameter in this embodiment, they may have different inside diameters as long as the two through holes 1 and 1' are arranged on a common axis. This should be noted that the first cylindrical body 2 and the second cylindrical body 2' are integrally molded together to form a one piece thus these two cylindrical bodies can also be simply referred as a cylindrical body in the later part of this description.

The second cylindrical body 2' is thicker than the first cylindrical body 2 so that the former has a larger outside diameter than the latter. Both the first flange 3 and second flange 4 have an annular shape of the same outside diameter while the insulator flange 5 is shaped like a horseshoe which would be obtained by cutting off part of an annular shape having the same outside diameter as the first flange 3 and second flange 4. As a result, part of an outside flat surface of the second flange 4 facing the insulator flange 5 is exposed. It is to be understood that the horseshoe shape of the insulator flange 5 is not limited to what is illustrated in the drawings, but may be modified into any form as long as the outside flat surface of the second flange 4 facing the insulator flange 5 is partly exposed.

The second flange 4 has at the aforementioned exposed area of its outside flat surface a lead wire guide block 8 projecting in the direction of the insulator flange 5. There is formed a lead wire passage 9 in the lead wire guide block 8 penetrating itself in a direction connecting between the periphery of the second cylindrical body 2' and the through hole 1' in the second cylindrical body 2', or in a direction intersecting the axis of the through hole 1' in the second cylindrical body 2'. Part of the lead wire guide block 8 protrudes beyond the circumference of the second flange 4 as illustrated. This arrangement helps reduce the physical size of the exciting coil assembly since the lead wire guide block is formed at the partially exposed area of the flat surface of the second flange. There is formed a cutout 10 in the second cylindrical body 2' where an extension of the lead wire passage 9 cuts the curved wall of the second cylindrical body 2', the cutout 10 extending up to the outside surface of the insulator flange 5.

On the outside flat surface of the second flange 4, there is formed a lead wire guide slit 11 extending to both sides of the cutout 10 just between the lead wire guide block 8 and the second cylindrical body 2'. Mutually facing sides of the lead wire guide block 8 and the second cylindrical body 2' are individually shaped into flat surfaces to form the lead wire guide slit 11. There are formed sharp-edged corners C (FIG. 4) at least where the lead wire passage 9 passing through the lead wire guide block 8 connects to the lead wire guide slit 11 or where the lead wire guide slit 11 cuts the periphery of the second cylindrical body 2'. Furthermore, there are formed a pair of parallel slits 12 and 13 in the second flange 4 opposite to the lead wire guide block 8 with respect to the through hole 1', both of the slits 12 and 13 having their openings on the periphery of the second flange 4 as shown in FIG. 4.

The lead wire retaining groove 7 has a two-stepped cross-sectional profile. Specifically, the lead wire retaining groove 7 is narrowed close to the second cylindrical body 2', broadened away from the second cylindrical body 2'. Referring to FIGS. 3 an 4, stepped projections 15 and 16 are formed on mutually facing flat surfaces of the second flange 4 and insulator flange 5 from the surface of the second cylindrical body 2' so that the lead wire retaining groove 7 is narrowed close to the second cylindrical body 2' and relatively broadened away from the surface of the second cylindrical body 2'. These widths of the lead wire retaining groove 7 are made approximately equal to outside diameters of lead wires which would be held in the lead wire retaining groove 7. In a modified form of the embodiment, the stepped projections 15 and 16 may be formed to provide a plurality of steps of different heights so that the lead wire retaining groove 7 is narrowest immediately on the surface of the second cylindrical body 2' and becomes wider farther away from the second cylindrical body 2' in more than two steps.

Inside the lead wire retaining groove 7, there is also formed a short circuit protection tab 17 just between the pair of slits 12 and 13 as shown in FIG. 4. The short circuit protection tab 17 prevents a short circuit of a coil caused by mutual contact between both ends of the coil which are passed through the pair of slits 12 and 13. In this embodiment, the short circuit protection tab 17 extends from the curved surface of the second cylindrical body 2' up to a point where the outermost end of the short circuit protection tab 17 lies between the surface of the second cylindrical body 2' and the peripheries of the second flange 4 and insulator flange 5.

On the curved inside surface of the through hole 1 in the first cylindrical body 2, there are formed a plurality of projections 18. When an exciting coil assembly constructed with the above-described coil bobbin is mounted on a mounting sleeve 31 for a field housing 32 of an electromagnetic clutch as shown in FIG. 8, the projections 18 press against the mounting sleeve 31 so that the exciting coil assembly is securely held on the mounting sleeve 31.

Figure 5:
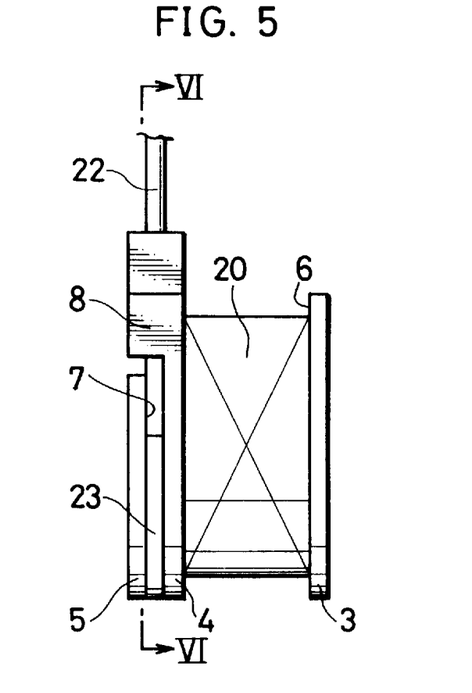
FIG. 5 is a front view of an exciting coil assembly according to the embodiment of the invention.
Figure 6:
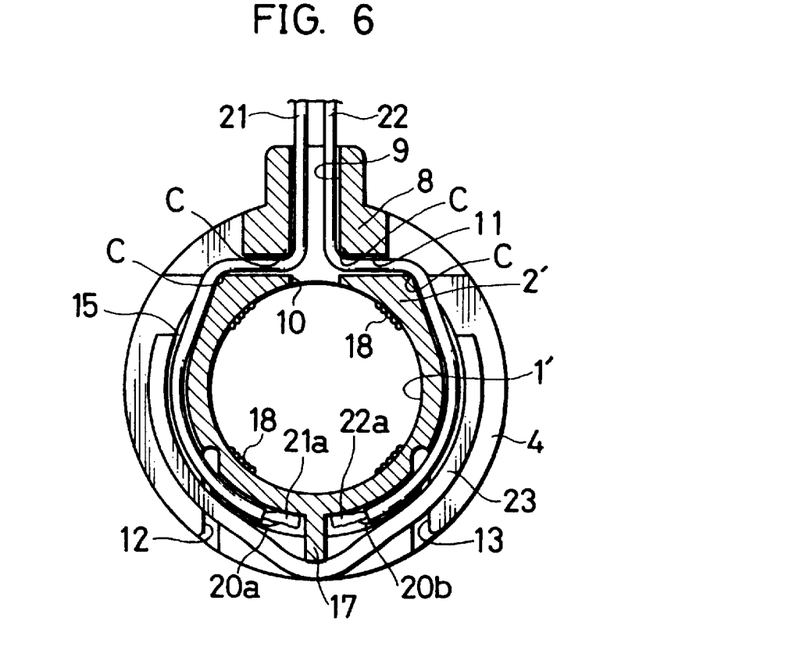
FIG. 6 is a cross-sectional view of the exciting coil assembly taken in the direction of arrows along lines B—B shown in FIG. 5.

FIGS. 5 and 6 illustrate an exciting coil assembly constructed with the above-described coil bobbin, where FIG. 5 is a front view of the exciting coil assembly, and FIG. 6 is a cross-sectional view of the exciting coil assembly taken in the direction of arrows along lines B—B shown in FIG. 5. Construction of the exciting coil assembly is now described along with its assembling procedure.

Referring to FIGS. 5 and 6, a coil 20 is wound around the coil winding portion 6 while a pair of lead wires 21 and 22 covered with an elastic insulating material like a synthetic resin are routed along the lead wire retaining groove 7. Both ends 20a and 20b of the coil 20 are passed from the coil winding portion 6 into the lead wire retaining groove 7 by way of the pair of slits 12 and 13 formed in the second flange 4 and soldered to ends 21a and 22a of the lead wires 21 and 22, respectively.

In this embodiment, the pair of lead wires 21 and 22 to which the ends 20a and 20b of the coil 20 are connected are routed immediately along the curved surface of the second cylindrical body 2' where the lead wire retaining groove 7 is narrowed by the stepped projections 15 and 16. The lead wires 21 and 22 are then passed through the lead wire guide slit 11 and the lead wire passage 9 to the outside of the coil bobbin. Routed along the lead wire retaining groove 7 and led to the outside of the coil bobbin as described above, the pair of lead wires 21 and 22 will be caught by the earlier-mentioned sharp-edged corners C formed on the second cylindrical body 2' and/or the lead wire guide block 8 and tensile stresses do not reach beyond those corners C even when they are pulled from outside the coil bobbin. It should be recognized from the foregoing discussion that the pair of lead wires 21 and 22 would not come out of the lead wire retaining groove 7. As such, the above construction effectively prevents potential breakage of the solder joints at the ends 20a and 20b of the coil 20, resulting in a substantial improvement in the reliability of the exciting coil assembly.

The pair of lead wires 21 and 22 are placed in the lead wire retaining groove 7 in the following manner. First, both ends 21a and 22a of the lead wires 21 and 22 are introduced from outside the coil bobbin through the lead wire passage 9 in the lead wire guide block 8 and passed into the through hole 1' through the cutout 10 in the second cylindrical body 2'. Next, the two lead wires 21 and 22 of which ends 21a and 22a have been passed into the through hole 1' are bent apart from each other to both sides of the lead wire guide slit 11. The lead wires 21 and 22 are then individually fitted into the respective lead wire guide slits 11, 11 and bent along the curved surface of the second cylindrical body 2' so that they are neatly arranged in the lead wire retaining groove 7. The cutout 10 provided in the coil bobbin allows the pair of lead wires 21 and 22 to be arranged in the lead wire retaining groove 7 in a simple and easy way as described above.

Alternatively, the pair of lead wires 21 and 22 may be first arranged along the curved surface of the second cylindrical body 2' and then routed along the lead wire guide slit 11 and passed through the lead wire passage 9 to the outside of the coil bobbin. In this case, the pair of lead wires 21 and 22 routed along the lead wire guide slit 11 should preferably be bent in the direction of the through hole 1' through the cutout 10 before passing them into the lead wire passage 9. If the lead wires 21 and 22 are then bent in the direction of the lead wire passage 9, it would be remarkably easy to pass them through the lead wire passage 9.

The pair of lead wires 21 and 22 are connected to the ends 20a and 20b of the coil 20 after routing the lead wires 21 and 22 in the lead wire retaining groove 7 by either one of the above-described methods. Specifically, the ends 20a and 20b of the coil 20 and the ends 21a and 22a of the lead wires 21 and 22 are taken to the outside of the coil bobbin. The end 20a of the coil 20 and the end 21a of the lead wire 21 are twisted together while the 20b of the coil 20 and the end 22a of the lead wire 22 are twisted together, and their twisted joint areas are soldered. After soldering, the ends 20a and 20b of the coil 20 and the ends 21a and 22a of the lead wires 21 and 22 are re-placed into the lead wire retaining groove 7 so that the solder joints are properly accommodated within the lead wire retaining groove 7.

When the above-described coil bobbin is used for constructing an exciting coil assembly, the pair of lead wires 21 and 22 will not come off the coil bobbin even before they are soldered to the ends 20a and 20b of the coil 20. Soldering work can therefore be carried out with the joint areas placed to the outside of the coil bobbin with the coil bobbin held by an automated soldering system, for instance. Accordingly, the coil bobbin of the invention greatly improves soldering work efficiency. Since the solder joints accommodated within the lead wire retaining groove 7 are located on opposite sides of the short circuit protection tab 17, a short circuit resulting from mutual contact between the ends 20a and 20b of the coil 20 are prevented.

After the solder joints have been fitted into the lead wire retaining groove 7, a retainer (or a press member) 23 made of an insulated wire covered with a similar insulating material to but having a larger diameter than the lead wires 21 and 22 is pushed into the wide section of the lead wire retaining groove 7 so that the retainer 23 is placed around the pair of lead wires 21 and 22. When pushed into the lead wire retaining groove 7, the retainer 23 remains in position due to its elasticity. The retainer 23 fitted over the lead wires 21 and 22 prevents them from slacking out of the lead wire retaining groove 7. Securely holding the pair of lead wires 21 and 22 within the lead wire retaining groove 7, the retainer 23 helps ensure reliable electric insulation performance.

Although the above-described retainer 23 embraces both of the lead wires 21 and 22, the embodiment may be modified in such a way that the individual lead wires 21 and 22 are secured by respective retainers. It should be obvious that the material of the retainer 23 is not limited to the insulated wire. Furthermore, the retainer 23 is optional in a case where the pair of lead wires 21 and 22 themselves are tightly fitted into the lead wire retaining groove 7.

Figure 7:
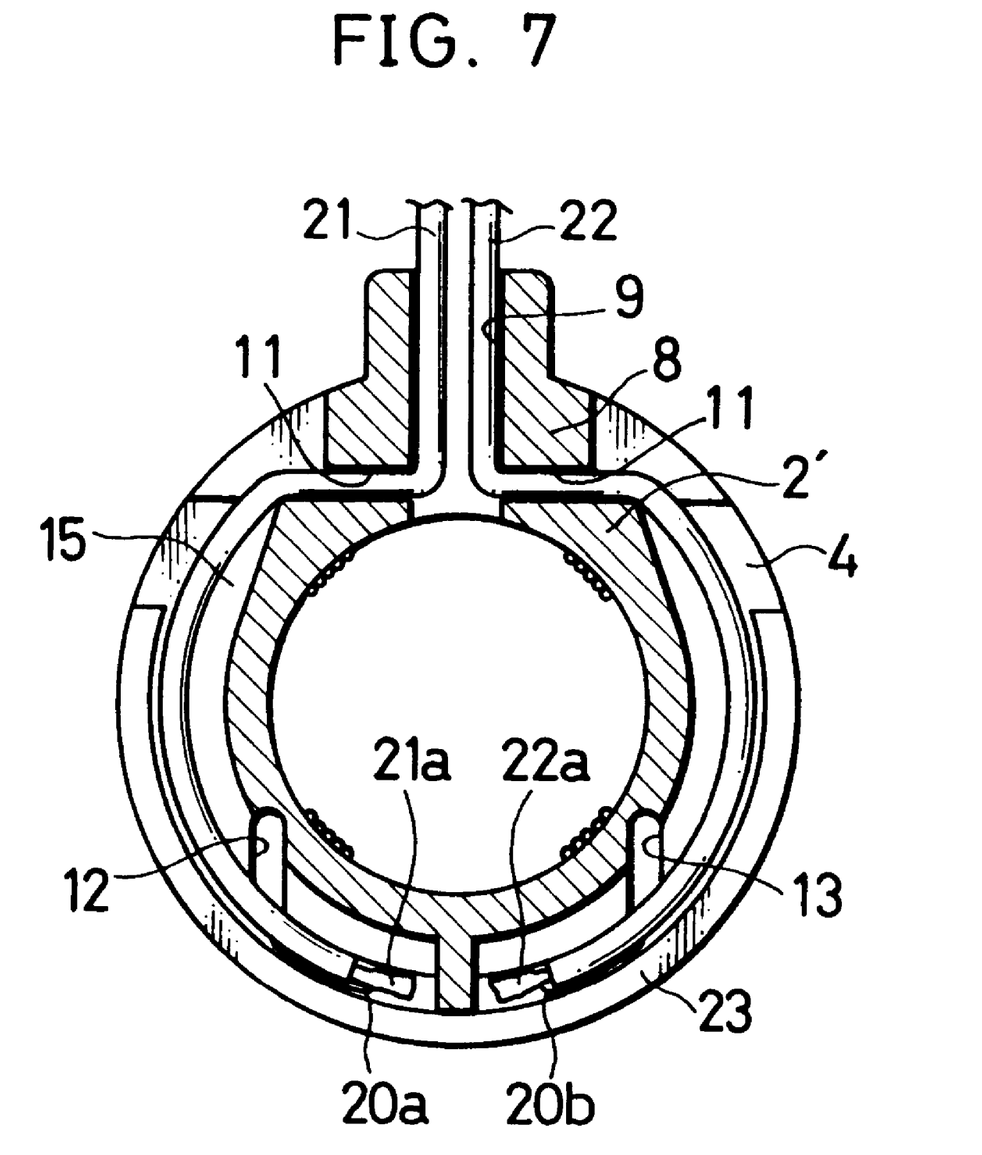
FIG. 7 is a cross-sectional view corresponding to FIG. 6 illustrating an exciting coil assembly according to a varied form of the embodiment.

FIG. 7 is a cross-sectional view corresponding to FIG. 6 illustrating an exciting coil assembly according to a varied form of the embodiment which employs a pair of lead wires 21 and 22 thicker than those shown in FIGS. 5 and 6. In this varied form of the embodiment, the pair of lead wires 21 and 22 are arranged in the wide section of the lead wire retaining groove 7 outside the stepped projections 15 and 16. Except this point, the exciting coil assembly of FIG. 7 has exactly the same construction as shown in FIGS. 5 and 6. In this case, the retainer 23 is not absolutely necessary if the pair of lead wires 21 and 22 themselves are tightly fitted into the lead wire retaining groove 7.

Even when it is required to use different sizes of lead wires 21 and 22 depending on the type of exciting coil assembly to be manufactured, the same coil bobbin can be used according to the invention because it has the multi-step lead wire retaining groove 7 having a narrow section close to the second cylindrical body 2' and a wide section away from the second cylindrical body 2'. This would serve to simplify component control, resulting in production cost savings.

In the above-described embodiment and its variations, the lead wire guide block 8 is formed on the flat outside surface of the second flange 4 at the location where the insulator flange 5 is partly cut off. In a still varied form of the embodiment, the insulator flange 5 may be formed in the same shape as the second flange 4 so as not to expose the flat surface of the second flange 4 and then form the lead wire guide block 8 in such a way that it protrudes from outside the periphery of the second flange 4 in the direction of the insulator flange 5. In this variation, the inside opening of the lead wire passage 9 should be located directly in a radial direction of the lead wire retaining groove 7 in a similar manner to the foregoing embodiment.

Although not illustrated, an insulating tape may be wound around the coil 20 where appropriate to further improve the electric insulation performance. This will not cause such difficulty in assembly processes as was experienced with conventional coil bobbins because a commercially available insulating tape can be used and taping work itself is quite simple.

What is claimed is:

1. A coil bobbin comprising:
   a cylindrical body having a through hole in the center thereof;
   a separating flange formed on an outer surface of the cylindrical body between opposite ends thereof;
   a coil winding portion provided on one side of the separating flange in a longitudinal direction of the cylindrical body;
   a lead wire retaining portion provided on the other side of the separating flange in the longitudinal direction of the cylindrical body;
   a protector provided at the end of the lead wire retaining portion for protecting a lead wire to be placed in the lead wire retaining portion;
   a guide block formed on the separating flange and a passage adapted for guiding a lead wire being defined in the guide block;
   the guide block projecting from the separating flange to the protector along the longitudinal axis of the cylindrical body;
   the passage defined in the guide block extending substantially radially outwardly from a central axis of the cylindrical body;
   a cut out portion for allowing communication between the through hole of the cylindrical body and the passage being defined in the protector; and
   a guide slit intersecting a line connecting the cutout portion and the passage being defined between the guide block and the protector for allowing a communication between the passage and the lead wire retaining portion.

2. A coil bobbin according to claim 1, wherein a pair of slits are defined in the separating flange for allowing a communication between the coil winding portion and the lead wire retaining portion and a short circuit protection tab is formed in the lead wire retaining portion at a position between the pair of slits for preventing a short circuit of the coil by a mutual contact between both ends of the coil.

3. A coil bobbin according to claim 2, wherein the separating flange is made in a stepped configuration in its side view such that the further away it is from the central axis of the cylindrical body, the wider the longitudinal distance between the separating flange and the protector is.

4. A coil bobbin according to claim 2, wherein;
   the cut out portion is positioned with respect to the passage such that a first line extending along a middle portion of the passage goes through the cut out portion; and
   the guide slit is defined for allowing communication between the through hole and the lead wire retaining portion through the cut out portion, and the guide slit extends substantially perpendicular to the first line.

5. A coil bobbin according to claim 4, wherein a first diameter of the cylindrical body corresponding to the lead wire retaining portion is greater than a second diameter of the cylindrical body corresponding to the coil winding portion.

6. An exciting coil assembly comprising:
   a cylindrical body having a through hole in the center thereof;
   a separating flange formed on an outer surface of the cylindrical body between opposite ends thereof;
   a coil winding portion provided on one side of the separating flange in a longitudinal direction of the cylindrical body;
   a lead wire retaining portion provided on the other side of the separating flange in the longitudinal direction of the cylindrical body;
   a protector provided at the end of the lead wire retaining portion for protecting a lead wire to be placed in the lead wire retaining portion;
   a pair of lead wires placed in the lead wire retaining portion;
   a coil wound around the cylindrical body corresponding to the coil winding portion;
   both ends of the coil extending to the lead wire retaining portion and being connected with the pair of lead wires respectively;
   a guide block being formed on the separating flange with a passage defined therein, the pair of lead wires extending through the passage;
   the guide block projecting from the separating flange to the protector along a longitudinal axis of the cylindrical body;
   the passage defined in the guide block extending substantially radially outwardly from the longitudinal axis;
   a cut out portion for allowing a communication between the through hole of the cylindrical body and the passage being defined in the protector; and
   a slit intersecting a line connecting the cutout portion and the passage being defined between the guide block and the protector for allowing communication between the passage and the lead wire retaining portion, and thereby the lead wire extending from an outermost end of the guide block through the passage to the lead wire guiding portion via the slit.

7. An exiting coil according to claim 6, wherein a pair of slits are defined in the separating flange thereby ends of coil extends through the slits respectively to the lead wire retaining portion and a short circuit protection tab is formed in the lead wire retaining portion at a position between the pair of slits for preventing a short circuit of the coil by a mutual contact between both ends of the coil.

8. An exciting coil assembly according to claim 7, further comprising a press member for press fitting in the lead wire retaining portion from radially outwardly for securely accommodating the lead wire into the lead wire retaining portion.

* * * * *